(12) United States Patent
Ueki et al.

(10) Patent No.: US 9,036,923 B2
(45) Date of Patent: *May 19, 2015

(54) AGE ESTIMATION APPARATUS, AGE ESTIMATION METHOD, AND AGE ESTIMATION PROGRAM

(75) Inventors: Kazuya Ueki, Tokyo (JP); Masashi Sugiyama, Tokyo (JP); Yasuyuki Ihara, Tokyo (JP)

(73) Assignees: NEC Solution Innovators, Ltd., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 13/263,057

(22) PCT Filed: Apr. 14, 2010

(86) PCT No.: PCT/JP2010/056689
§ 371 (c)(1),
(2), (4) Date: Nov. 9, 2011

(87) PCT Pub. No.: WO2010/125915
PCT Pub. Date: Nov. 4, 2010

(65) Prior Publication Data
US 2012/0045137 A1 Feb. 23, 2012

(30) Foreign Application Priority Data
Apr. 28, 2009 (JP) .................. 2009-109613

(51) Int. Cl.
*G06K 9/62* (2006.01)
*G06K 9/00* (2006.01)

(52) U.S. Cl.
CPC .... *G06K 9/6273* (2013.01); *G06K 2009/00322* (2013.01)

(58) Field of Classification Search
CPC .................. G06F 17/30247; G06F 17/30268; G06F 17/30707
USPC .......... 382/224–231, 218, 181, 182, 190, 195
See application file for complete search history.

(56) References Cited

U.S. PATENT DOCUMENTS 6,625,303 B1* 9/2003 Young et al. .................. 382/132

FOREIGN PATENT DOCUMENTS

CN 1741069 A 3/2006
JP 2005148880 A 0/2005
(Continued)

OTHER PUBLICATIONS

M. MtYA E—I Al., "Ciass-Dista~ce Weighted Locality Preserving P~'ojectiot~ and Its Application: To Facial image Based Age Classification", IEICE Technical Report, PRMU2007*48 ~o 89 2007 pp. 83-88.*

(Continued)

*Primary Examiner* — Mike Rahmjoo
(74) *Attorney, Agent, or Firm* — Sughrue Mion, PLLC

(57) ABSTRACT

Provided are an age estimation apparatus, an age estimation method, and an age estimation program capable of obtaining a recognition result closely matching the result perceived by human. An age estimation apparatus 10 for estimating an age of a person on image data includes a dimension compressor 11 for applying dimension compression to the image data to output low dimensional data; and an identification device 12 for estimating an age of a person on the basis of a learning result using a feature amount contained in the low dimensional data, wherein a parameter used for the dimension compression by the dimension compressor 11 and the feature amount used for age estimation by the identification device 12 are set on the basis of a result of an evaluation of a generalization capability using a weighting function that shows a degree of seriousness of an age estimation error for every age, and learning of the identification device 12 is performed on the basis of the weighting function.

4 Claims, 8 Drawing Sheets

(56) References Cited

FOREIGN PATENT DOCUMENTS

| | | |
|---|---|---|
| JP | 2004318632 A | 11/2004 |
| JP | 2009086901 A | 4/2009 |

OTHER PUBLICATIONS

International Search Report for PCT/JP2010/056689 mailed May 18, 2010.

Y.Fu et al., "Estimating human age by manifold analysis of face pictures and regression on aging features", ICME 2007, Proceedings of the IEEE Multimedia and Expo, 2007, pp. 1383-1386.

M. Miya et al., "Class-Distance Weighted Locality Preserving Projection and Its Application to Facial Irrmage Based Age Classification", IEICE Technical Report, PRMU2007-48 to 89, 2007, pp. 83-88.

Decision for Grant of Patent; Application No. 10-2011-7028325; Oct. 31, 2013 with partial English translation.

Office Action, dated Aug. 29, 2013, issued by the State Intellectual Property Office of the People's Republic of China in counterpart Chinese Application No. 201080019038.3.

Ueki, K et al, "Class Distance Weighted Locality Preserving Projection for Automatic Age Estimation," Biometrics: Theory, Applications and Systems, 2008, BTAS, IEEE International Conference, pp. 1-5.

Communication dated May 6, 2014 from the People's Republic of China in counterpart to Chinese application No. 201080019038.3.

\* cited by examiner

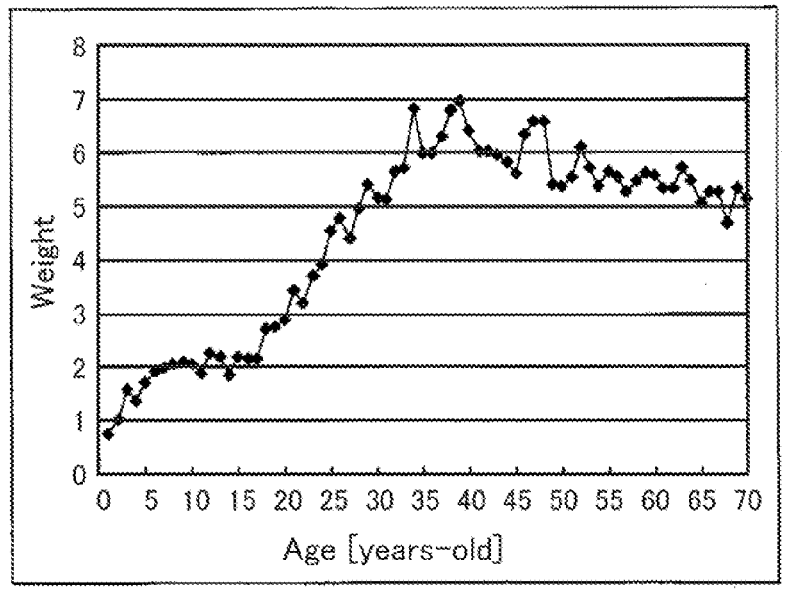
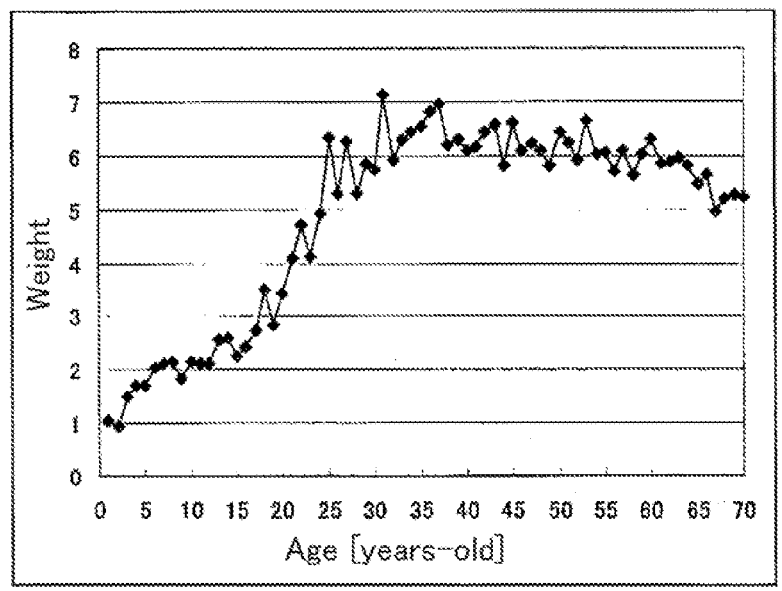
FIG. 2
| | Women | Men |
|---|---|---|
| Without weight | 4.36 | 2.45 |
| With weight | 3.08 | 2.21 |
FIG. 3

AGE ESTIMATION APPARATUS, AGE ESTIMATION METHOD, AND AGE ESTIMATION PROGRAM

TECHNICAL FIELD

The present invention relates to an apparatus, a method, and a program for estimating a human apparent age.

BACKGROUND ART

For marketing in stores and the like, the age brackets of customers coming to the store are analyzed and the type and quantity of merchandises are managed on the basis of the analysis.

For example, in convenience stores and the like, employed is the method of analyzing the age brackets of customers by estimating the age groups of the customers by clerks at the time of checkout and inputting the estimation result.

However, the result of manual age estimation impairs objectivity because it greatly includes the personal point of view of an estimator. Therefore, there is a demand for mechanical estimation of a human age with an identification device or the like on the basis of facial image data.

The method of mechanically estimating a human age with an identification device or the like on the basis of facial image data can be broadly divided into two methods. One is the method of identifying age categories such as child, adult, and senior, which is the method of estimating an age as a discrete quantity (the method in which age estimation is performed as an identification problem). The other is the method of identifying an age itself, which is the method of estimating an age as a continuous quantity (the method in which age estimation is performed as a regression problem).

In the method of identifying age categories as in the invention disclosed in Patent Document 1, for example, it is also attempted to identify age categories by subdividing on 10 ages basis. However, in the case where an age problem is solved as an identification problem, there are following problems:

data desired to be kept away from each other are brought closer to each other whereas data desired to be close to each other are separated from each other; and
the relationship of continuous ages cannot be expressed.
These problems cause the decrease in accuracy of age recognition.

For example, in the case where the categories such as the age of 10 to 19 and the age of 20 to 29 are provided at the time of identifying age categories on 10 ages basis, the contradiction arises that ages having 1 year difference therebetween such as 19 years old and 20 years old are intended to be separated from each other and ages having 9 years difference therebetween such as 10 years old and 19 years old are intended to be brought closer.

Further, when one category is separated away from other categories, the distance among the categories cannot be changed. For example, when the category of 10s is separated away from all other age groups, the distance between 10s and 20s is the same as that between 10s and 50s. That is, the distance between distant age groups cannot be extended and the distance between near age groups cannot be reduced.

In contrast, in the case where age estimation is performed as a regression problem as in Non-Patent Document 1, since continuous ages can be expressed, it has been demonstrated by experiments that the contradiction less arises as compared to the case where age estimation is performed as an identification problem and an age can be recognized with high accuracy.

The regression problem can be obtained by solving the difference between an estimated age and a correct age as a problem of minimization. Specific examples include the multiple linear regression analysis and the (kernel) ridge regression. These methods execute learning so as to reduce the mean square error or the mean absolute error between the estimated age and the correct age.

FIG. 9 shows an example of the age estimation apparatus that performs age estimation as a regression problem. Generally, the image data to be inputted is high dimensional data such as the number of pixels or the number of pixels×3 (color values of R, G, and B). Therefore, in a dimension compressor 61, features are extracted from image data such that age information is emphasized and unnecessary information (lighting condition, facial angle, and the like) is deleted. For example, methods such as the principal component analysis (PCA), the linear discriminant analysis (LDA), and the locality preserving projection (LPP) are employed. This processing is also referred to as the "feature selection" and "dimension compression".

Then, an identification device 62 estimates an age on the basis of the features extracted.

In order to estimate an age with an age estimation apparatus 60 on the basis of the image data, learning of the dimension compressor 61 and the identification device 62 is required.

That is, plural image data of people whose correct ages (actual ages or perceptual ages) are known are inputted to the dimension compressor 61, and each data is evaluated by the methods such as the N-fold cross validation and the leave-one-out cross-validation. On the basis of this evaluation result, an output of the identification device 62 is adjusted so that the error (the difference between the estimated age and the correct age) would be reduced. For the learning of the identification device 62, the methods such as the linear regression, the multiple regression, the ridge regression, and the neural network are applied.

By repeating similar procedures while changing the type and combination of features, the extraction method (i.e., a parameter used for dimension compression), and the like, a parameter and a model are selected so that the error would be reduced.

RELATED ART DOCUMENT

Patent Document

Patent Document 1: JP 2005-148880 A

Non-Patent Document

Non-Patent Document 1: Y. Fu, Y. Xu, and T. S. Huang. Estimating human age by manifold analysis of face pictures and regression on aging features, Proceedings of the IEEE Multimedia and Expo, pp. 1383-1386, 2007

SUMMARY OF INVENTION

Problem to be Solved by the Invention

However, since the distances between ages are different depending on intended ages, use of the mean square error and mean absolute error between the estimated age and the correct age causes the decrease in accuracy of age recognition.

For example, in the case where there is the 10 years old difference (error) between the correct age and the recognition age, the degree of seriousness should be different between the case where the age of 5 is mistaken for the age of 15 and the case where the age of 35 is mistaken for the age of 45. In other words, even in the error of the same 10 years old difference, mistaking the age of 5 for the age of 15 means mistaking a kindergarten child for a junior high school student or a high school student, and this is very serious error in the human sense. On the other hand, since the facial feature of a 35 years old human is very similar to that of a 45 years old human, the difference therebetween often cannot be identified even by human. Therefore, mistaking the age of 35 for the age of 45 is not as serious as mistaking the age of 5 for the age of 15.

The appearance of human sharply changes in the stage of youth such as the stage of growth, and gently changes after becoming an adult. Therefore, even with the error of the same age difference, a problem arises if the evaluations are made with the same indicator.

FIG. 10 shows an example of the result of the age estimation by estimators for every age on the basis of facial images. The graph shows "the standard deviation of the estimated age (variation degree)" in the case of classifying, for every age, the result of estimation of an age of a person whose correct age is known. The horizontal axis indicates the correct age (true age) of the subject and the vertical axis shows the standard deviation of the estimation error. Here, the correct age (true age) is the average value of the ages estimated by the estimators. Since the standard deviation of the young adults is small, it can be understood that most estimators estimate young adults as similar ages.

Therefore, if the data of a young adult is mistakenly recognized as an adult in an age estimation apparatus, this greatly differs from the result perceived by human.

As described above, an age estimation apparatus and an age estimation method capable of obtaining a recognition result closely matching a human sense has not been provided.

The present invention is made in view of the foregoing problems, and is intended to provide an age estimation apparatus and an age estimation method capable of obtaining a recognition result closely matching the result perceived by human.

Means for Solving Problem

In order to achieve the aforementioned object, as the first aspect, the present invention provides an age estimation apparatus for estimating an age of a person on image data including: a dimension compression unit for applying dimension compression to the image data to output low dimensional data; and an identification unit for estimating an age of a person on the basis of a learning result using a feature amount contained in the low dimensional data, wherein a parameter used for the dimension compression by the dimension compression unit and the feature amount used for age estimation by the identification unit are set on the basis of a result of an evaluation of a generalization capability using a weighting function that shows a degree of seriousness of an age estimation error for every age.

Further, in order to achieve the aforementioned object, as the second aspect, the present invention provides an age estimation apparatus for estimating an age of a person on image data including: a dimension compression unit for applying dimension compression to the image data to output low dimensional data; and an identification unit for estimating an age of a person on the basis of a learning result using a feature amount contained in the low dimensional data, wherein learning of the identification unit is performed on the basis of a weighting function that shows a degree of seriousness of an estimated age error for every age.

Further, in order to achieve the aforementioned object, as the third aspect, the present invention provides an age estimation method for estimating an age of a person on image data including: a dimension compression step for applying dimension compression to the image data to output low dimensional data; and an identification step for estimating an age of a person on the basis of a learning result using a feature amount contained in the low dimensional data, wherein a parameter used for the dimension compression in the dimension compression step and the feature amount used for age estimation in the identification step are set on the basis of a weighting function that shows a degree of seriousness of an age estimation error for every age.

Further, in order to achieve the aforementioned object, as the fourth aspect, the present invention provides an age estimation method for estimating an age of a person on image data including: a dimension compression step for applying dimension compression to the image data to output low dimensional data; and an identification step for estimating an age of a person on the basis of a learning result using a feature amount contained in the low dimensional data, wherein an identification device conducting the identification step is made to learn on the basis of a weighting function that shows a degree of seriousness of an estimated age error for every age.

Further, in order to achieve the aforementioned object, as the fifth aspect, the present invention provides an age estimation program causing a computer to execute age estimation processing for estimating an age of a person on image data, wherein the computer is served as a dimension compression unit for applying dimension compression to the image data to output low dimensional data and an identification unit for estimating an age of a person on the basis of a learning result using a feature amount contained in the low dimensional data, and the computer is caused to set a parameter used for the dimension compression by the dimension compression unit and the feature amount used for age estimation by the identification unit on the basis of a result of an evaluation of a generalization capability using a weighting function that shows a degree of seriousness of an estimated age error for every age.

Further, in order to achieve the aforementioned object, as the sixth aspect, the present invention provides an age estimation program causing a computer to execute age estimation processing for estimating an age of a person on image data, wherein the computer is served as a dimension compression unit for applying dimension compression to the image data to output low dimensional data and an identification unit for estimating an age of a person on the basis of a learning result using a feature amount contained in the low dimensional data, and the computer is caused to execute learning of the identification unit on the basis of a weighting function that shows a degree of seriousness of an estimated age error for every age.

Effects of the Invention

According to the present invention, an age estimation apparatus, an age estimation method, and an age estimation program capable of obtaining a recognition result closely matching the result perceived by human can be provided.

BRIEF DESCRIPTION OF DRAWINGS

FIG. 1 is a view showing the configuration of the age estimation apparatus according to the First Embodiment in which the present invention is implemented suitably.

[FIG. 2] FIGS. 2A and 2B are views showing examples of the weighting functions on the basis of the standard deviation of the estimated age error.

[FIG. 3] FIG. 3 is a view showing the comparison result of the recognition accuracy between the kernel regularized least squares without weight and the kernel regularized weighted least squares.

FIGS. 4A and 4B are views showing the results of the evaluations of the estimation error made for each true age of the test data.

FIG. 5 is a view showing an example of the weighting function in which the error recognition sensitivity is artificially increased at the younger age bracket and the older age bracket.

FIGS. 6A and 6B are views showing the results of the evaluations of the estimation error made for each true age of the test data by the weighted mean square error using the weighting function shown in FIG. 5.

FIGS. 7A and 7B are views showing examples of two weighting functions, in which the weight assigned to the younger age bracket and the weight assigned to the middle-aged bracket are different.

FIG. 8 is a view showing an example of the weighting function in which the value of weight around the age of 20 is small.

FIG. 9 is a view showing an example of the age estimation apparatus that performs age estimation as a regression problem.

FIG. 10 is a view showing an example of the result of the age estimation by estimators for every age on the basis of facial images.

DESCRIPTION OF EMBODIMENTS

[First Embodiment]

The First Embodiment in which the present invention is implemented suitably will be described.

Figure 1:
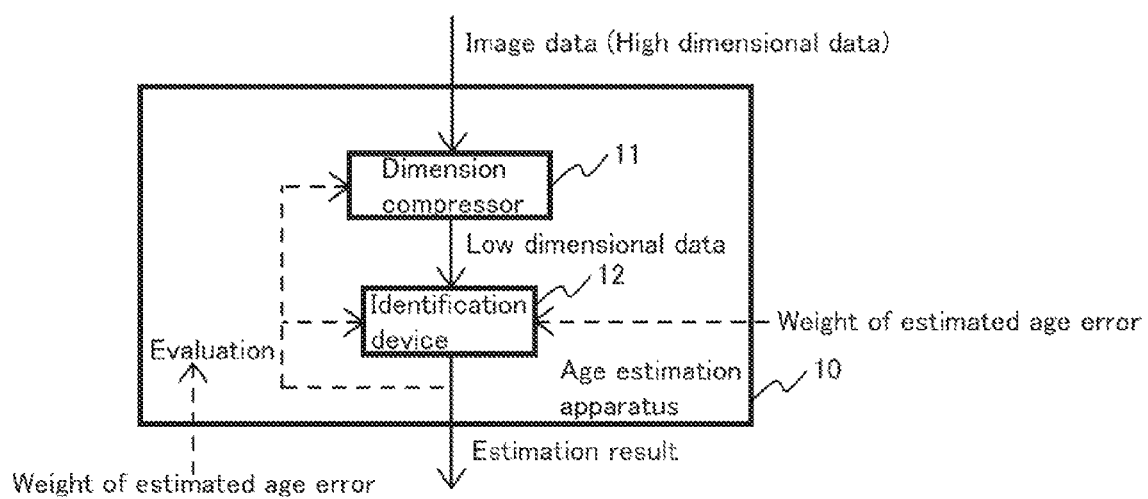
[FIG. 1]

FIG. 1 shows the configuration of the age estimation apparatus according to this Embodiment. An age estimation apparatus 10 includes a dimension compressor 11 and an identification device 12. Generally, the image data to be inputted to the age estimation apparatus 10 is high dimensional data such as the number of pixels or the number of pixels×3 (color values of R, G, and B). The dimension compressor 11 extracts features from image data such that age information is emphasized and unnecessary information (lighting condition, facial angle, and the like) is deleted. For example, the features are extracted by the methods such as PCA, LDA, and LPP. The identification device 12 estimates an age on the basis of the features extracted by the dimension compressor 11.

As the dimension compressor 11 and identification device 12, those having common configurations can be employed. However, the feature extraction method (a parameter used for the dimension compression) in the dimension compressor 11 and the type of the identification device 12 are decided on the basis of the evaluation result obtained in consideration of the "weight" that shows the degree of seriousness of the estimated age error. Further, by introducing the concept of the weight into the content of the learning of the identification device 12, the feature extraction that can obtain the estimation result closely matching the human recognition result can be achieved.

Under the application of n-labeled training data $(x_i, y_i)$ [$x_i$ is an explanatory variable (facial feature <this may also be referred to as a feature vector>), $y_i$ is an objective variable (age), i is 1 to n], in a supervised regression problem that predicts a true age y* of the test data, which is the extraction source of the feature vector x, with y*=f(x), when the age estimation function f(x) is modeled by the linear combination of the positive definite kernel k (X, x') using the method of assigning a weight to the regularized least squares to a kernel function (the kernel regularized weighted least squares: KRWLS), it can be expressed by the following expression (I).

$$f\alpha(x) = \sum_{i=1}^{n} \alpha_i k(x_i, x) \quad (1)$$

Figure 10:
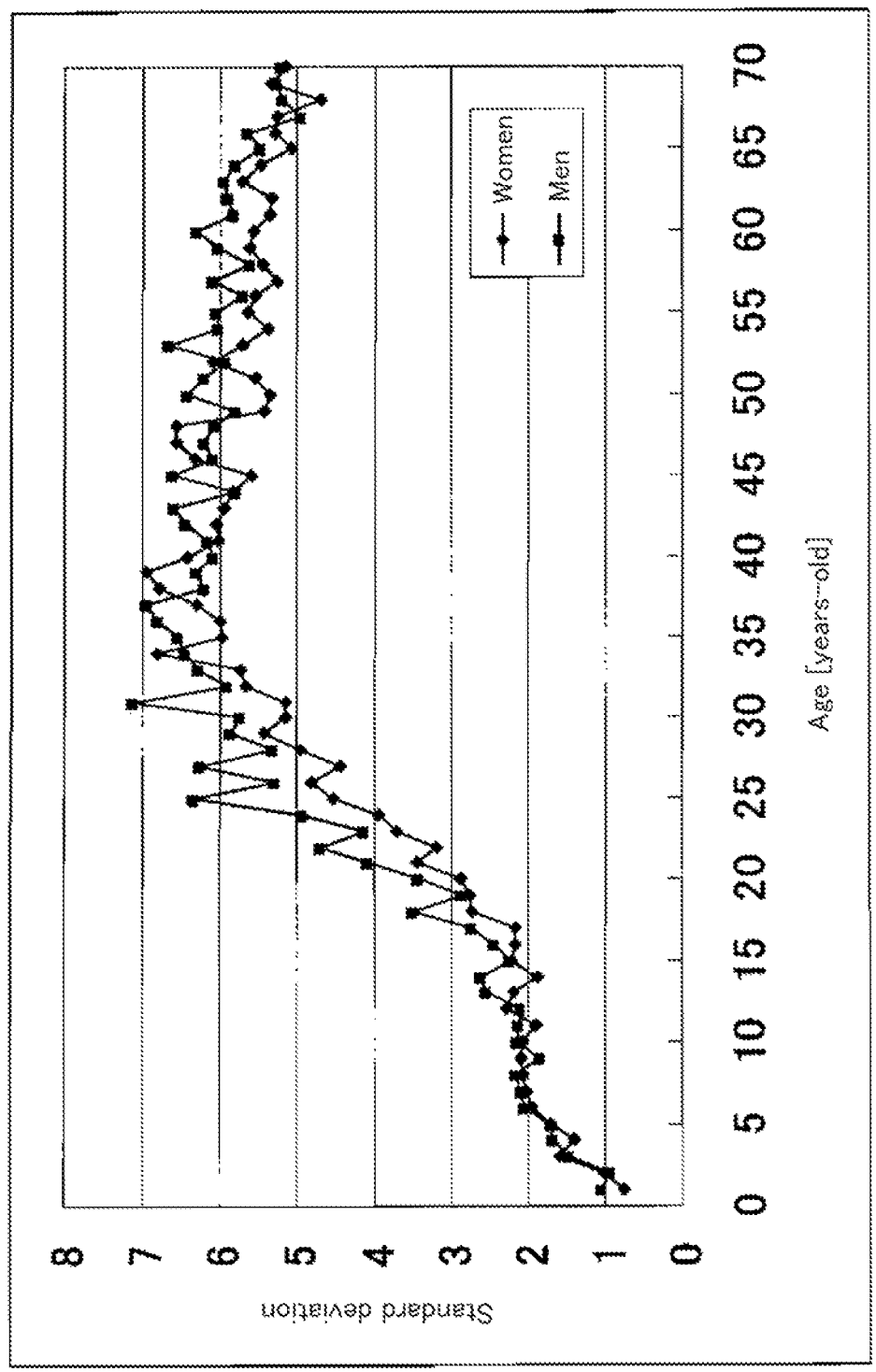
[FIG. 10]

In the case where the number of training data n is large, not all the kernel function k $(x_i, x)$ [i is 1 to n] but the subset thereof may be used. In the identification device 12, learning of the parameter shown by the following expression (2) (matrix with n rows and 1 column with $\alpha_1$ to $\alpha_n$ as a component) is performed such that the following expression (3) is minimized.

$$\alpha = (\alpha_1, \ldots, \alpha_n)^T \quad (2)$$

$$L(\alpha) = \frac{1}{n}\sum_{i=1}^{n} \frac{(y_i - f\alpha(x_i))^2}{w(y_i)^2} + \lambda\|\alpha\|^2 \quad (3)$$

w(y) is weighting function, $\|\cdot\|$ is Euclidean norm of $\mathbb{R}$ $\lambda(>0)$ in the expression (3) is a regularization parameter that is introduced for preventing overfitting, and the second term of the expression (3) is a correction term for preventing overfitting. The weighting function w (y) is a function that expresses the degree of seriousness of an estimated age error for every age. The smaller the value (weight) of the w (y) is, the more serious the estimated age error. In this Embodiment, the function that takes the value of the standard deviation of FIG. 10 is used as the w (y). That is, the weighting function shown in FIG. 2A is applied to women, and the weighting function shown in FIG. 2B is applied to men.

An optimal solution in the expression (3) can be given by the following expression (4).

$$\text{Optimal solution } \hat{\alpha} = \underset{\alpha}{\text{argmin}} L(\alpha) = (K^T D K + n\lambda I_n)^{-1} K^T D y \quad (4)$$

K Kernel matrix having $k(x_i, x_j)$ as (ij)-component
$K^T$ Transposed matrix of K
D n-dimensional matrix having $$\frac{1}{w(y_i)^2}$$

as (i,i)-diagonal component
$I_n$ n-dimensional unit matrix
y n-dimensional vector having $y_i$ as i-component In the case where the number of training data n is large, since the calculation of the parenthesized part in the expression (4) is difficult, an optimal solution may be obtained by reducing the number of kernel functions used or by conducting a numerical calculation by the gradient method.

By using the optimal solution obtained in this manner as a parameter, the ages of m-test data are predicted.

Here, the test data and the true age thereof are expressed as follows.

Test data $\{\tilde{x}_i\}_{i=1}^m$

True age of test data $\{\tilde{y}_i^*\}_{i=1}^m$

The evaluation of the generalization capability is made according to the following expression (5) on the basis of the weighted mean square error (WMSE).

$$WMSE = \frac{1}{m}\sum_{i=1}^{m} \frac{(\tilde{y}^* - f\hat{\alpha}(\tilde{x}_i))^2}{w(\tilde{y}_i^*)^2} \quad (5)$$

At the time of deciding the feature extraction method in the dimension compressor 11 and deciding the type of the identification device 12, by performing the N-fold cross validation and the leave-one-out cross-validation using the learning data and test data, the evaluation is made on the basis of the WMSE of the expression (5), and the method and the type that achieve the highest accuracy among the test data (the method and the type causing minimal error) are selected.

Here, the case is considered in which the number of the labeled training data n is 2000, the number of the test data m is 1500, 200 data randomly selected from the labeled training data equally selected from each age group such that the number of data of each age group is equal is the center of the kernel function, and the gauss kernel shown in the following expression (6) is used as the kernel function. The kernel width σ and the regularization parameter λ are decided such that the test error becomes minimal.

$$k(x, x') = \exp\left(-\frac{\|x - x'\|^2}{2\sigma^2}\right) \quad (6)$$

FIG. 3 shows the comparison result of the recognition accuracy between the kernel regularized least squares (KRLS) without weight and the KRWLS using the weighting function of FIGS. 2A and 2B. In FIG. 3 "without weight" indicates the value of the WMSE of the case where learning is performed by applying a constant value (1 in this case) to the value w (y) in the expression (1), and "with weight" indicates the value of the WMSE of the case where learning is performed by applying the values shown in FIGS. 2A and 2B to the value w(y) in the expression (1). As is obvious from FIG. 3, in the case where the evaluation of the generalization capability is made with the WMSE of the expression (5), the value of the WMSE is small with the case of the KRWLS as compared to the case of the KRLS.

Figure 4:
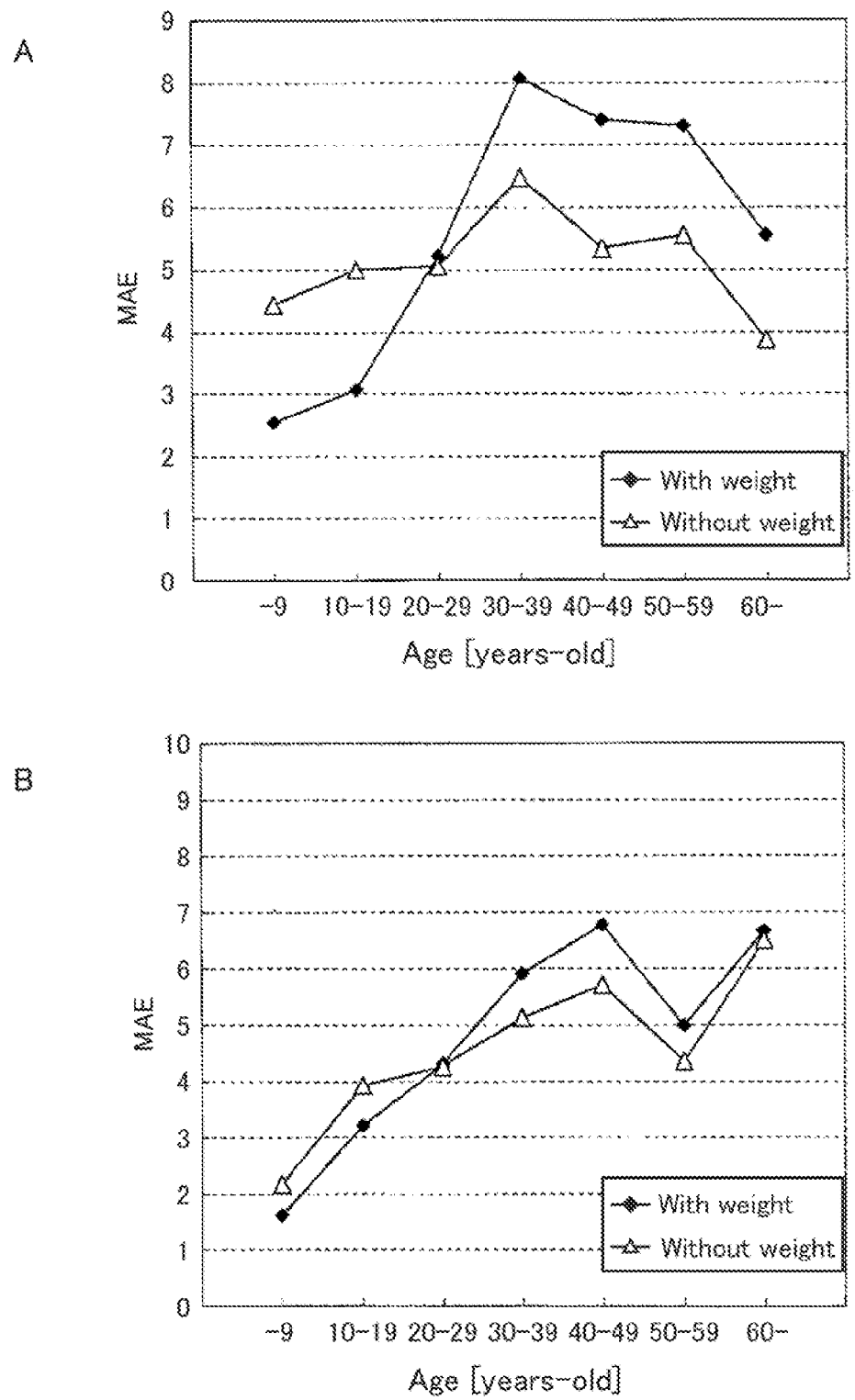
[FIG. 4]

In order to show how the learning result changes by assigning the weight, the results of the evaluations of the estimation error made for each true age of the test data are shown in FIGS. 4A and 4B. FIG. 4A shows the evaluation result of women, and FIG. 4B shows the evaluation result of men. In FIG. 4, the vertical axis indicates the mean absolute error (MAE) that is not assigned with the weight of the estimated age. Here, the MAE of the estimated age can be calculated by the following expression (7).

$$MAE = \frac{1}{m}\sum_{i=1}^{m}|y_i - y_i^*| \quad (7)$$

The MAE of the estimated age expresses the average distance between the estimated age and the true age. In FIG. 4A, the MAE of the "without weight" of the age under 10 years old (horizontal axis "−9") is 4.5, and this shows that the test data of women with the true age under 10 years old is estimated as an age 4.5 years old differs from the true age on average. As is obvious from FIGS. 4A and 4B, by assigning the weight, the MAE in the younger age bracket, in which the error is sensitively perceived by human, of both of men and women is reduced. Therefore, it can be confirmed that the data, the error of which is sensitively perceived by human, can be classified with higher accuracy.

In this manner, by using the WMSE as the evaluation criteria, the feature extraction method and the identification device that output ages closely matching human perceptual ages can be selected.

Since the feature extraction method and the identification device are selected so as to output ages closely matching human perceptual ages, the age estimation apparatus according to this Embodiment can output the estimation result closely matching the human sense.

Further, since an age is estimated with the identification device in which learning closely matching the human sense is performed, ages closely matching perceptual ages can be estimated.

Here, the case in which the weight is considered for both of the selection of the feature extraction method and the identification device and the learning of the identification device is described as an example in this Embodiment. However, the age estimation error can be reduced even by performing only one of the selection and the learning.

[Second Embodiment]

The Second Embodiment in which the present invention is implemented suitably will be described. The age estimation apparatus according to this Embodiment has the configuration similar to that of the First Embodiment, and includes a dimension compressor 11 and an identification device 12.

As with the First Embodiment, as the dimension compressor 11 and identification device 12, those having common configurations can be employed. Further, as with the First Embodiment, the learning of the identification device 12 is performed using the concept of the weight, and the feature extraction method in the dimension compressor 11 and the type of the identification device 12 are decided on the basis of the evaluation result obtained in consideration of the "weight".

However, this Embodiment is different from the First Embodiment in that the weighting function on the basis of the actual measurement data is used in the First Embodiment whereas the weighting function artificially made is applied to the expressions (3) to (5) in this Embodiment.

Figure 5:
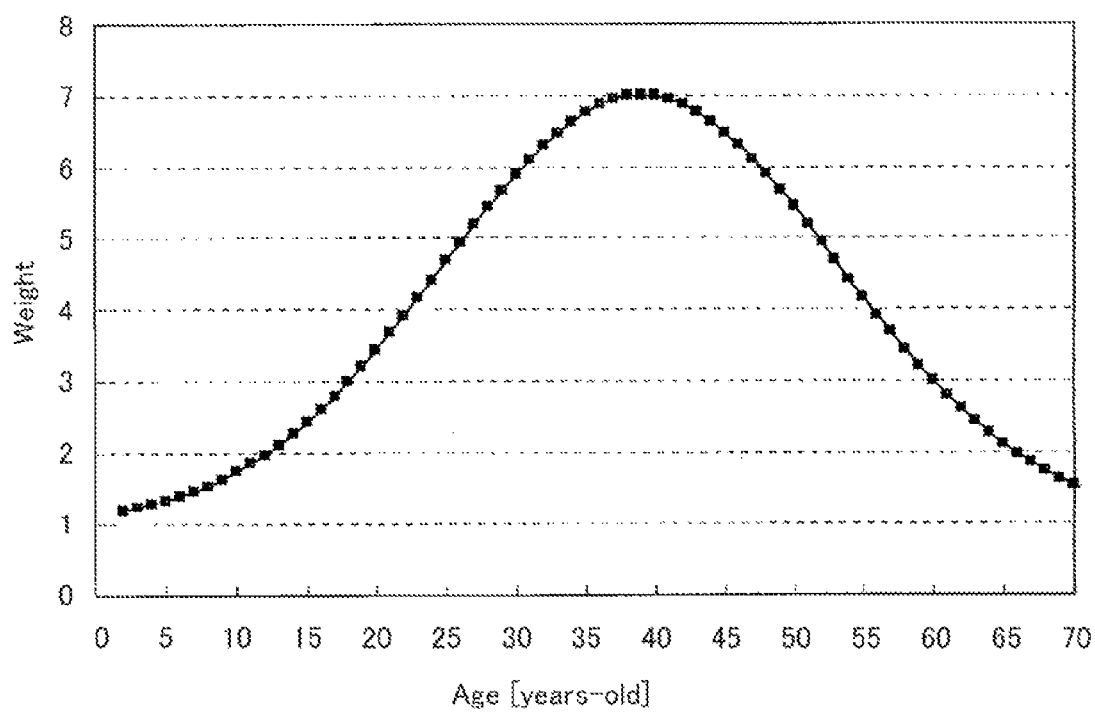
[FIG. 5]
Figure 6:
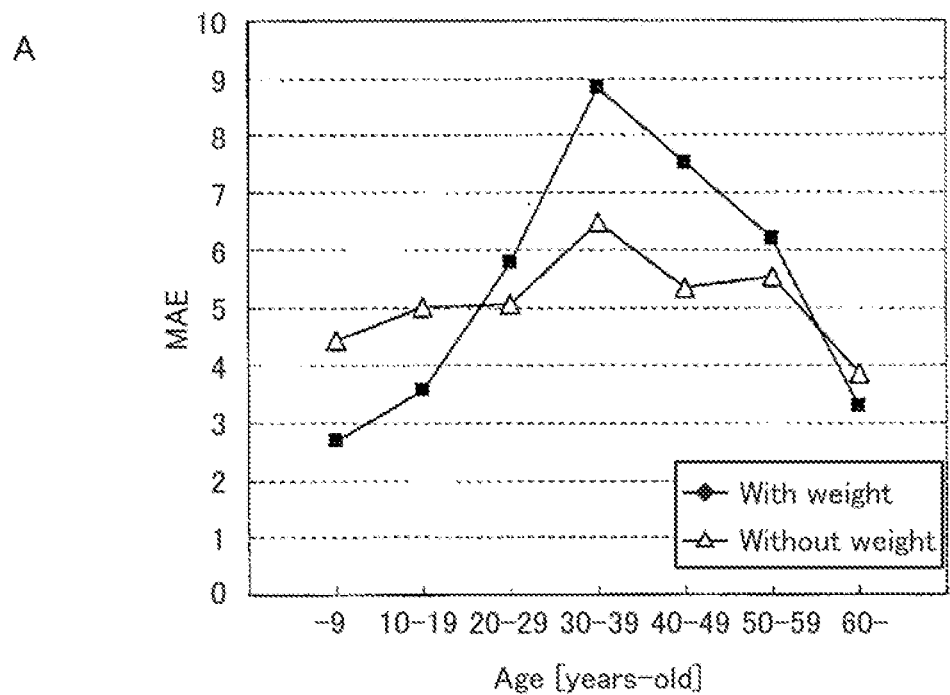
[FIG. 6]
Figure 6:
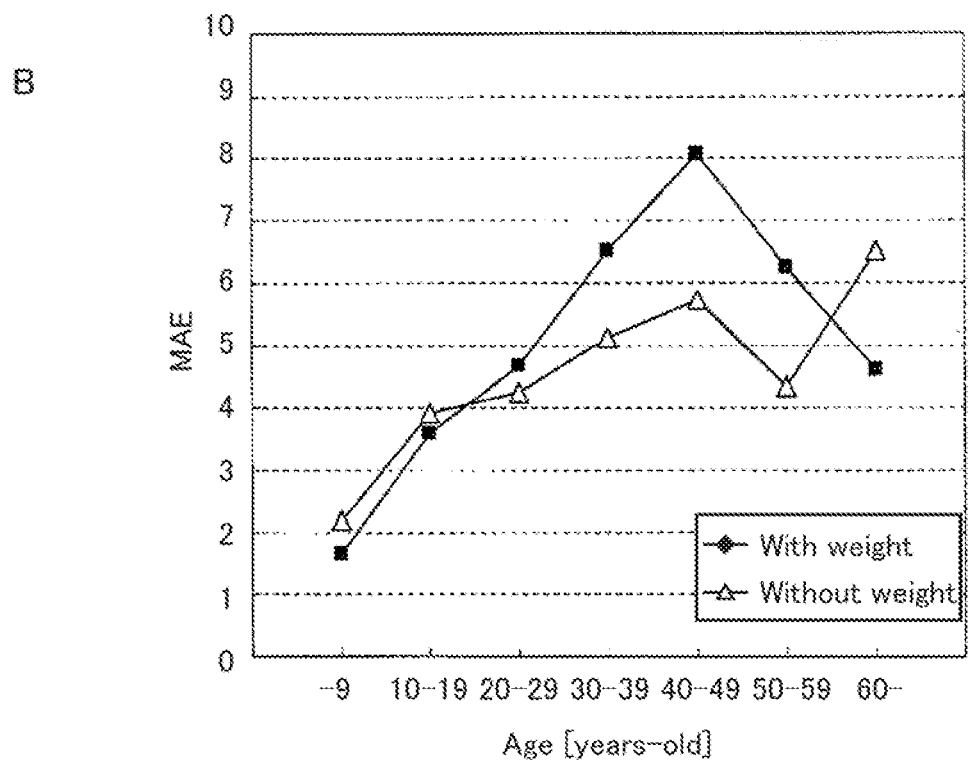

FIG. 5 shows an example of the weighting function in which the error recognition sensitivity is artificially increased at the younger age bracket and the older age bracket (i.e., the value of weight is set small at the younger age bracket and the older age bracket). In this Embodiment, the same weighting function is applied to both of men and women. Further, FIGS. 6A and 6B show the results of the evaluations of the estimation error made for each true age of the test data by the WMSE using the weighting function shown in FIG. 5. FIG. 6A shows the evaluation result of women, and FIG. 6B shows the evaluation result of men. As is obvious from FIGS. 6A and 6B, there is a correlation between the amount of weight and the MAE value with respect to both of men and women, and there is a tendency that the MAE value decreases as the weight decreases. In other words, the MAE of the younger age bracket and the older age bracket, in which the weight assigned is small in FIG. 5, is decreased whereas the MAE of the age bracket between the younger age bracket and the older age bracket, in which the weight assigned is large in FIG. 5, is increased.

With respect to an arbitrary age, when the weight assigned is reduced, the WMSE value increases because the value of the denominator in $\Sigma$ in the expression (5) decreases. The fact that the WMSE value is large means that the evaluation of the degree of seriousness of the estimated age error in that age is made with emphasis. Accordingly, in the case where the estimation error of a specific age group is desired to be reduced, the estimation error of the desired age group can be reduced by setting the weighting function such that the value of weight in the desired age group is small and by deciding the feature extraction method in the dimension compressor 11 and the type of the identification device 12 on the basis of the WMSE of large value.

Since this Embodiment is similar to the First Embodiment except for the above, duplicate descriptions will be omitted.

[Third Embodiment]

The Third Embodiment in which the present invention is implemented suitably will be described. An age estimation apparatus 10 according to this Embodiment has the configuration similar to that of the First and Second Embodiments, and includes a dimension compressor 11 and an identification device 12.

As with the First and Second Embodiments, as the dimension compressor 11 and identification device 12, those having common configurations can be employed. Further, as with the First and Second Embodiments, the learning of the identification device 12 is performed using the concept of the weight, and the feature extraction method in the dimension compressor 11 and the type of the identification device 12 are decided on the basis of the evaluation result obtained in consideration of the "weight".

However, this Embodiment is different from the Second Embodiment in that the Second Embodiment uses just one weighting function whereas this Embodiment uses more than one weighting function.

As has been described in the Second Embodiment, by using the weighting function in which the weight of one age group is set smaller than that of other age groups, the MAE of the age group can be reduced and the accuracy of the age estimation can be increased.

Therefore, if the test data can be classified roughly into some age brackets preliminarily, it is considered that, by separately evaluating the generalization capability so that the estimation error for each age bracket is reduced, the estimation error in all the age brackets can be reduced. In this Embodiment, the feature extraction method in the dimension compressor 11 and the type of the identification device 12 are decided for each of the age brackets on the basis of the weighting function that differs among the age brackets.

Figure 7:
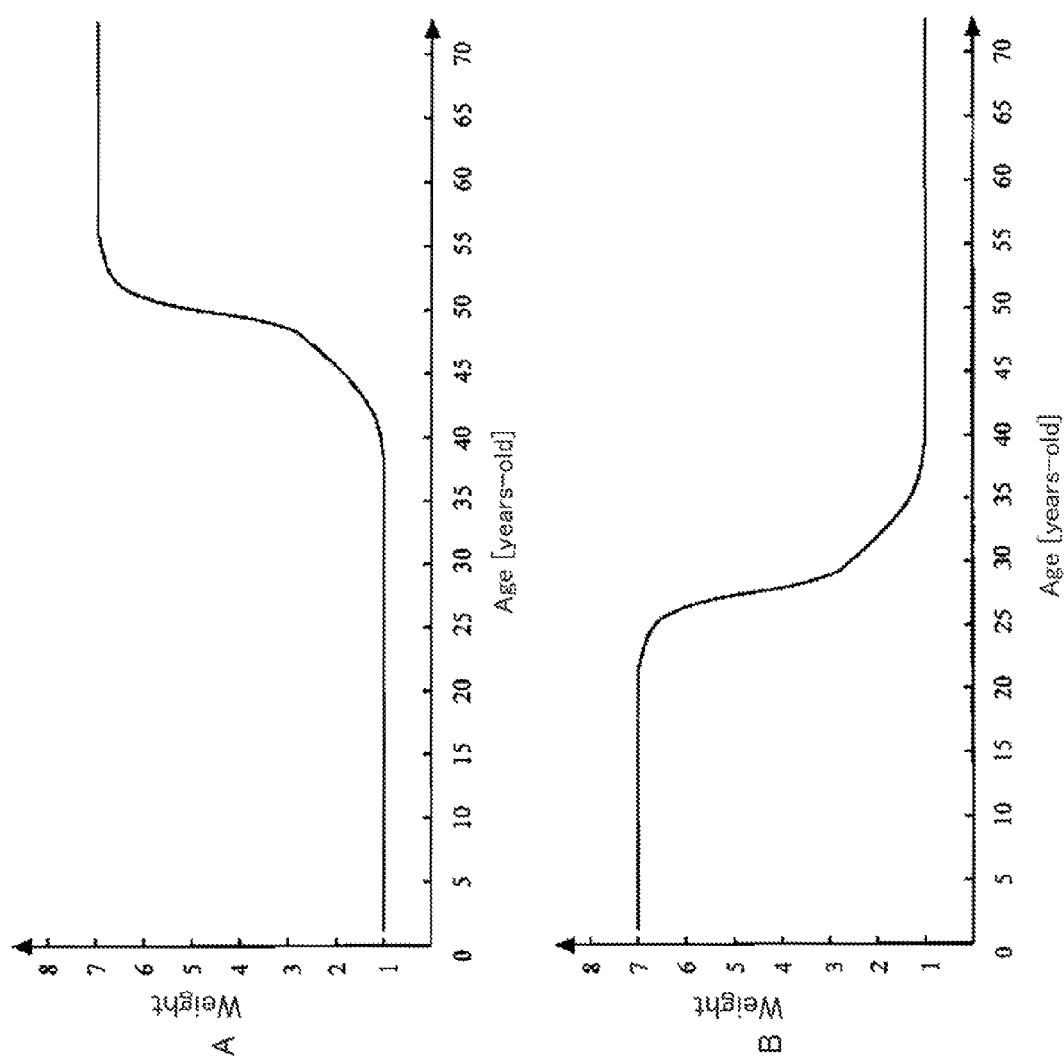
[FIG. 7]

Specifically, in the case where the test data is classified into the younger age bracket and the middle-aged bracket, when the evaluation of the generalization capability and learning of the identification device 12 using the weighting function (FIG. 7A), in which the value of weight is small at the younger age bracket and the value of weight is large at the middle-aged bracket, are performed with respect to the test data of the younger age bracket and the evaluation of the generalization capability and learning of the identification device 12 using the weighting function (FIG. 7B), in which the value of weight is large at the younger age and the value of weight is small at the middle-aged bracket, are performed with respect to the test data of the middle-aged bracket, and the results thereof are integrated, the estimation error can be reduced in all the age brackets.

Here, also in the case where the test data is classified into three or more age brackets and the decision of the feature extraction method in the dimension compressor 11 and the type of the identification device 12 and the learning of the identification device 12 are performed for each of the age brackets on the basis of the weighting function that differs among the age brackets, the same as the aforementioned example in which the test data is classified into two age brackets can be applied.

Since this Embodiment is similar to the First and Second Embodiments except for the above, duplicate descriptions will be omitted.

The Embodiments described above are mere examples in which the present invention is implemented suitably, and the present invention is not limited thereto.

Figure 8:
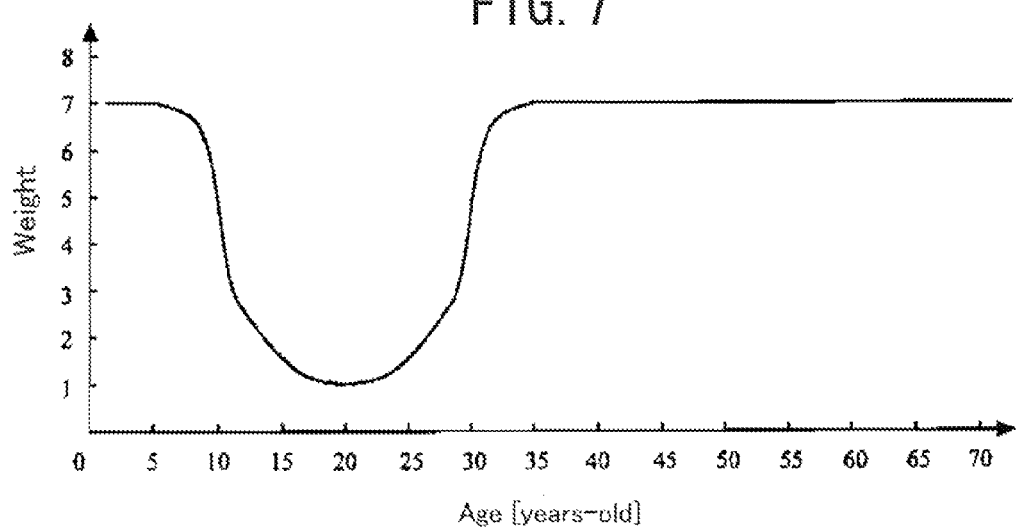
[FIG. 8]
Figure 9:
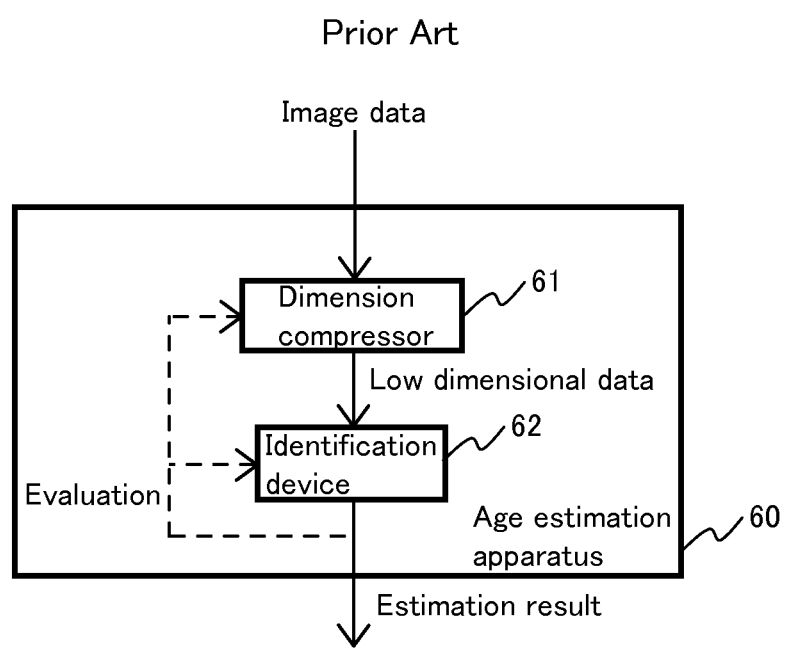
[FIG. 9]

For example, as shown in FIG. 8, by setting the weighting function such that the value of weight around the age of 20 is small, the degree of separation around the age of 20 is increased and the degree of recognition can be increased. The use of such a weighting function makes it possible to improve the identification accuracy between majors and minors.

In this manner, various changes can be made in the present invention.

The invention of the present application is described above with reference to the Embodiments. However, the invention of the present application is not limited to the above-described Embodiments. Various changes that can be understood by those skilled in the art can be made in the configurations and details of the invention within the scope of the invention of the present application.

This application claims priority from Japanese Patent Application No. 2009-109613 filed on Apr. 28, 2009. The entire subject matter of the Japanese Patent Applications is incorporated herein by reference.

EXPLANATION OF REFERENCE NUMERALS

10 age estimation apparatus
11 dimension compressor
12 identification device

The invention claimed is:

1. An age estimation apparatus for estimating an age of an object contained by an image data, the age estimation apparatus comprising:
    a processor configured to control any of a dimension compression unit and an identification unit;
    the dimension compression unit configured to output low dimensional data of image data by applying a dimension compression to the image data by extracting a feature from the image data; and
    the identification unit configured to minimize a value of a predetermined function, to set a learned parameter for determining an age bracket in which an error of an estimated age is minimized, and to estimate the age using the learned parameter, wherein
    the age is estimated from a feature which is contained in the low dimensional data,
    the error is calculated between the estimated age and a correct age,
    the predetermined function is defined by the error,
    the learned parameter is set by a weighting function which is a function of the age bracket,
    the correct age being the age of the object contained by the image data, the weighting function is defined on the basis of a standard deviation of each of a plurality of perceptual ages, and the identification unit is further configured to estimate the age to closely match a human recognition result.

2. The age estimation apparatus according to claim 1, wherein a plurality of the weighting functions are used.

3. An age estimation method for estimating an age of an object contained by an image data, comprising:

outputting, to an identification device, low dimensional data of the image data by applying a dimension compression to the image data by extracting a feature from the image data;

estimating an age of the object on the image data from a feature extracted from the image data contained in the low dimensional data;

defining a value of a predetermined function by an error between the estimated age and a correct age;

minimizing the value of the predetermined function;

setting a learned parameter for determining an age bracket by a weighting function which is a function of age for determining the age bracket in which the error of the estimated age is minimized, wherein the estimated age is estimated from the feature contained in the low dimensional data using the learned parameter, the correct age being the age of the object contained by the image data, defining the weighting function on the basis of a standard deviation of each of a plurality of perceptual ages, and estimating the age to closely match a human recognition result.

4. The age estimation method according to claim 3, wherein a plurality of the weighting functions are used.

* * * * *

UNITED STATES PATENT AND TRADEMARK OFFICE
CERTIFICATE OF CORRECTION

PATENT NO. : 9,036,923 B2
APPLICATION NO. : 13/263057
DATED : May 19, 2015
INVENTOR(S) : Kazuya Ueki et al.

Page 1 of 1

It is certified that error appears in the above-identified patent and that said Letters Patent is hereby corrected as shown below:

ON THE TITLE PAGE

Item 56, Column 2, Line 2: Delete "Irrmage" and insert -- Image --

IN THE SPECIFICATION

Column 6, Line 3: Delete "k (X, x')" and insert -- k (x, x') --

Column 6, Line 29: Delete " $\mathbb{R}$ " and insert -- $\mathbb{R}^n$ --

Column 6, Line 49: Delete "(ij)" and insert -- (i,j) --

Column 6, Line 59: Delete "In" and insert -- $I_n$ --

Signed and Sealed this
First Day of December, 2015

Michelle K. Lee
*Director of the United States Patent and Trademark Office*